US008525701B2

(12) United States Patent
Fabas et al.

(10) Patent No.: US 8,525,701 B2
(45) Date of Patent: Sep. 3, 2013

(54) METHOD AND DEVICE FOR CENTRALIZED MANAGEMENT OF WARNINGS IN AN AIRCRAFT COMPRISING SEVERAL WARNING PRESENTATION INTERFACES

(75) Inventors: Nicolas Fabas, Castelmaurou (FR); Amaud Bellier, Saint-Jean (FR)

(73) Assignee: Airbus Operations S.A.S., Toulouse (FR)

( * ) Notice: Subject to any disclaimer, the term of this patent is extended or adjusted under 35 U.S.C. 154(b) by 361 days.

(21) Appl. No.: 12/879,561

(22) Filed: Sep. 10, 2010

(65) Prior Publication Data

US 2011/0063136 A1 Mar. 17, 2011

(30) Foreign Application Priority Data

Sep. 16, 2009 (FR) ...................................... 09 56367

(51) Int. Cl.
*G01C 23/00* (2006.01)
*G08B 25/14* (2006.01)
*G08B 23/00* (2006.01)

(52) U.S. Cl.
USPC ............ 340/963; 340/506; 340/517; 340/525

(58) Field of Classification Search
USPC ................................. 340/506, 517, 525, 963
See application file for complete search history.

(56) References Cited

U.S. PATENT DOCUMENTS

| | | | | |
|---|---|---|---|---|
| 3,678,256 | A * | 7/1972 | Harenberg, Jr. | 701/16 |
| 6,392,692 | B1 | 5/2002 | Monroe | |
| 2003/0058135 | A1 | 3/2003 | Kimmet | |
| 2005/0062598 | A1 * | 3/2005 | Akamatsu et al. | 340/506 |
| 2005/0264412 | A1 | 12/2005 | Levesque et al. | |
| 2010/0066565 | A1 * | 3/2010 | Francois et al. | 340/963 |

OTHER PUBLICATIONS

"AFDX Protocol Tutorial", Condor Engineering, AFDX/ARINC 664 Tutorial, XP007912659, URL:www.acalmicrosystems.co.uk/whitepapers/sbs8.pdf>, May 2005, 55 pages.

* cited by examiner

*Primary Examiner* — Daniel Wu
*Assistant Examiner* — Benyam Haile
(74) *Attorney, Agent, or Firm* — Oblon, Spivak, McClelland, Maier & Neustadt, L.L.P.

(57) ABSTRACT

A method and a device for centralized management of warnings in an aircraft including a centralized system for management of warnings and a plurality of warning presentation interfaces. The method includes determining at least one warning in the centralized system according to at least one alarm activation signal received, presenting the at least one warning by a first interface of the plurality of warning presentation interfaces, filtering the at least one determined warning to determine whether to also present the at least one determined warning by a second interface of the plurality of warning presentation interfaces, the second interface being separate from the first interface, and presenting, by the second interface, the at least one determined warning, in response to a determination by the filtering that the at least one determined warning is to also be presented by the second interface.

11 Claims, 6 Drawing Sheets

| Byte 0 | 1 | 2 | 3 | 4 | 5 | 6 | 7 |
|---|---|---|---|---|---|---|---|
| Length 1 | FDCE code 1 ---- | | | | | | |
| ---- FDCE code 1 | Alert 1 type | | Alert 1 Level | | Title 1 char 1 | Title 1 char 2 | ... |
| ... | ... | ... | ... | ... | Title 1 char 9 | Length 2 | FDCE code 2 |
| ---- FDCE code 2 | | | | | | | Alert 2 type |
| Alert 2 type (cont'd) | Alert 2 Level | | Title 2 char 1 | Title 2 char 2 | ... | ... | ... |
| . . | Title 2 char 7 | Length 3 | FDCE code 3 ---- | | | | |
| ---- FDCE code 3 | | | Alert 3 type | | Alert 3 Level | | Title 3 char 1 |
| Title 3 char 2 | ... | ... | Title 3 char 5 | | | | |

Fig. 6a

| Byte 0 | 1 | 2 | 3 | 4 | 5 | 6 | 7 |
|---|---|---|---|---|---|---|---|
| Alert 1 Level | | FDCE code 1 ---- | | | | | |
| ---- FDCE code 1 | | Alert 2 Level | | FDCE code 2 ---- | | | |
| ---- FDCE code 2 | | | | ... | | | |

Fig. 6b

| Byte 0 | 1 | 2 | 3 | 4 | 5 | 6 | 7 |
|---|---|---|---|---|---|---|---|
| FDCE code 1 ---- FDCE code 1 | | | | | | | |
| FDCE code 2 ---- FDCE code 2 | | | | | | | |
| FDCE cod e 3 ---- FDCE code 3 | | | | | | | |
| ... | | | | | | | |

Fig. 6c

METHOD AND DEVICE FOR CENTRALIZED MANAGEMENT OF WARNINGS IN AN AIRCRAFT COMPRISING SEVERAL WARNING PRESENTATION INTERFACES

This invention relates to the management of alarms in aircraft and more particularly to a method and a device for centralized management of warnings in an aircraft comprising several warning presentation interfaces.

Aircraft generally are equipped with alarm systems called FWS (abbreviation for Flight Warning System in English terminology) capable of detecting failures or abnormal configurations in order to warn the crew by virtue of the generation of visual and/or acoustic warnings and the display of procedures to be carried out and the status of the aircraft (list of inoperative systems, performance limitations, etc.).

FIELD

Alarms relating to abnormal configurations or to failures of the systems of an aircraft thus are managed in centralized manner by the alarm system of the aircraft. This system is responsible for a timely presentation of warning messages and associated procedures to the crew members in the cockpit via a skillful management of priorities and according to the flight phase and via a dedicated home-machine interface (HMI).

BACKGROUND

On certain aircraft, in particular certain military aircraft, specific crew members are in charge of the operations linked to the management of the cargo (loading and unloading of equipment on the ground, in-flight dropping of paratroopers or equipment, emergency medical evacuation and similar mission). These crew members, also called loadmasters in English terminology, are located in the cargo zone of the aircraft and have specific equipment items and interfaces allowing management of the cargo.

In particular, by analogy with the piloting operations incumbent upon the crew members present in the cockpit, the crew members working in the cargo zone of the aircraft may be warned of failures affecting a system having an impact on the operations for management of the cargo.

FIG. 1 schematically illustrates an alarm device making it possible to manage warnings linked to the piloting and cargo operations.

The device illustrated comprises a first system 100-1 for management of alarms comprising an interface for presentation of warnings linked to the piloting operations and a second system 100-2 for management of alarms comprising an interface for presentation of warnings linked to the cargo operations of an aircraft.

More precisely, first system 100-1 comprises one or more computers 105-1 for calculating and confirming warnings from information items originating from systems 110-1 to 110-*m* of the aircraft. The warnings calculated and confirmed may be displayed on one or more screens 115-1 and/or presented acoustically via one or more loudspeakers 120-1 to be indicated to the crew members in the cockpit.

Similarly, second system 100-2 comprises one or more computers 105-2 for calculating and confirming warnings from information items originating from systems 125-1 to 125-*n* of the aircraft. The warnings calculated and confirmed may be displayed on one or more screens 115-2 and/or presented acoustically via one or more loudspeakers 120-2 to be indicated to the loadmasters.

However, since certain failures may have impacts on the cockpit operations as well as on the cargo operations, a need arises for synchronization of tasks and communication between cockpit and cargo crew members. In particular for failures in common, that is to say failures having impacts on the cockpit and cargo operations, it is necessary to ensure a simultaneity of warning of the crew members in both zones of the aircraft. It is seen here that in the case of lack of synchronization in warning the crew members, risks of disturbing the pilots with actions of the loadmaster, who for example might be the only one to be warned with a failure on his own interface, could generate unacceptable extra work on the cockpit side in certain critical flight phases (for example on take-off or landing).

The proposed architectures on certain military aircraft do not make it possible to meet this need. In fact, for certain failures in common, that is to say failures having an effect on the cockpit and cargo operations, each interface relies on its own channel for detection of failures and on logics for detection and presentation of alarms developed independently and with very different levels of complexity. This results directly in risks of inconsistencies in presentation of the warning messages presented on each interface.

Furthermore, it is difficult to guarantee that the wording of alarms displayed on the cockpit interface and on the cargo interface will be consistent, which may mean a risk of misunderstanding by the crews.

SUMMARY

The invention makes it possible to resolve at least one of the problems set forth above.

The invention thus has as an object a method for centralized management of warnings in an aircraft comprising a centralized system for management of warnings and a plurality of warning presentation interfaces, each of the said interfaces being adapted for presenting at least one warning to a user, this method comprising the following steps,

- determination of at least one warning in the said centralized system for management of warnings according to at least one alarm activation signal received;
- presentation of the said at least one warning by a first interface of the said plurality of interfaces;
- filtering of the said at least one determined warning; and
- in response to the said step of filtering, presentation or not of the said at least one determined warning by a second interface of the said plurality of interfaces, the said second interface being separate from the first interface.

In this way the method according to the invention makes it possible to ensure a synchronized warning of the crew members working in different parts of an aircraft, for example in the cockpit on the one hand and in the cargo zone on the other hand, in case of failure or abnormal configuration of the aircraft having an effect on the tasks of each crew member. The method according to the invention thus makes it possible to have all the crew members take advantage of the same logic for optimized presentation of alarms according, for example, to the priority and to the flight phase. The method according to the invention also makes it possible to contribute to an optimal coordination and efficiency of the tasks of the crew members in the aircraft. Moreover, the method according to the invention makes it possible to avoid the risks of disturbing of the pilots by other crew members in certain critical flight phases.

According to a specific embodiment, the said step of presentation of the said at least one determined warning by the said first interface comprises a step of filtering in order to determine whether the said at least one determined warning should or should not be presented by the said first interface. Thus, according to this embodiment, all the warnings may be generated by a single system, the warnings being filtered by each interface.

According to another specific embodiment, the method further comprises a step of transmission of the said at least one determined warning to a peripheral warning system associated with the said second interface, the said step of filtering of the said at least one determined warning being implemented in the said peripheral warning system.

The method advantageously further comprises a step of determination of at least one warning in the said peripheral warning system.

Thus, according to this embodiment, warnings that may affect several different interfaces may be managed in centralized manner while warnings applying only to a specific interface are managed locally.

The invention also has as an object a computer program comprising instructions adapted for the implementation of each of the steps of the method described above when the said program is run on a computer. The advantages obtained by this computer program are similar to those cited above.

The invention likewise has as an object a device for management of warnings in an aircraft, this device comprising the following means,

- centralized means for management of warnings in order to determine at least one warning according to at least one alarm activation signal;
- first means for presentation of warnings in order to present at least one warning determined by the said centralized means for management of warnings;
- means for filtering in order to filter at least one warning determined by the said centralized means for management of warnings; and,
- second means for presentation of warnings in order to present at least one warning determined by the said centralized means for management of warnings and filtered by the said filtering means.

In this way the device according to the invention makes it possible to ensure a synchronized warning of the crew members working in different parts of an aircraft, for example in the cockpit on the one hand and in the cargo zone on the other hand, in case of failure or abnormal configuration of the aircraft having an effect on the tasks of each crew member. The device according to the invention thus makes it possible to have all the crew members take advantage of the same logic for optimized presentation of alarms according, for example, to priority and flight phase. The device according to the invention also makes it possible to contribute to an optimal coordination and efficiency of the tasks of the crew members in the aircraft. Moreover, the device according to the invention makes it possible to avoid the risks of disturbing of the pilots by other crew members in certain critical flight phases.

According to a specific embodiment, the said filtering means belong to the said centralized means for management of warnings, the said first mean for presentation of warnings presenting at least one warning determined by the said centralized means for management of warnings and filtered by the said filtering means.

Thus, according to this embodiment, all the warnings may be managed by a single system, the warnings being filtered by each interface.

According to another specific embodiment, the device further comprises peripheral warning means associated with the said second means for presentation of warnings, the said peripheral warning means comprising the said filtering means.

Thus, according to this embodiment, warnings that may affect several different interfaces may be managed in centralized manner while warnings applying only to a specific interface are managed locally.

Still according to a specific embodiment, the said peripheral warning means comprise gateway means for transmitting at least one alarm activation signal received by the said peripheral warning means to the said centralized means for management of warnings. These gateway means make it possible in particular to simplify the connection between different components of the aircraft.

The invention also has as an object an aircraft comprising the device described above.

BRIEF DESCRIPTION OF THE DRAWINGS

Other advantages, objectives and characteristics of this invention become apparent from the detailed description that follows, provided by way of non-limitative example, with reference to the attached drawings in which:

FIG. 6, comprising FIGS. 6*a*, 6*b* and 6*c*, shows exemplary architectures for messages that may be transmitted by a centralized system for management of alarms to one or more peripheral alarm systems; and, FIG. 7 illustrates an exemplary hardware architecture adapted for implementing the invention, in particular the centralized system for management of warnings and the peripheral alarm systems.

DETAILED DESCRIPTION

In general, the invention has as an object an architecture making it possible to centralize the processing relating to the alarms common to the operations of several crew members not involved in the same operations and who may be located in different places in the aircraft. The centralized processing of common alarms is carried out in a single system that makes the result of its alarm calculations available to other alarm systems managing their own interfaces.

Such an architecture makes it possible to standardize the nature of the messages displayed on each interface of the aircraft, in synchronized manner, so as to allow an optimal communication and synchronization among all the crew members in the aircraft (same information level and same moment of warning).

It is recalled here that the FWS is connected to a very great number of systems of the aircraft. Consequently, it is able to pick up a great number of messages relating to failures. Moreover, having numerous information items as input, it is able to indicate precisely the consequences of a failure of a system.

By way of illustration, the warnings calculated and presented to the pilots by the FWS may be based on very sophisticated activation and inhibition logics depending on the flight phase and the state of certain resources (electric, hydraulic and communication network) in order to present at the most opportune moment only the warning messages corresponding to true failures and to filter the untimely alarms. These alarm logics are also often the result of complex processing applied at the inputs such as results of selections and a source-selection logic, failure storage and confirmation times.

Thus, the FWS preferably is used as a centralized processing system for warnings.

According to a first embodiment, the FWS system manages the detection of all the alarms required in the aircraft, that is to say, for example, the alarms linked to cockpit and cargo operations as well as the display of warnings on the corresponding interfaces.

Figure 1:
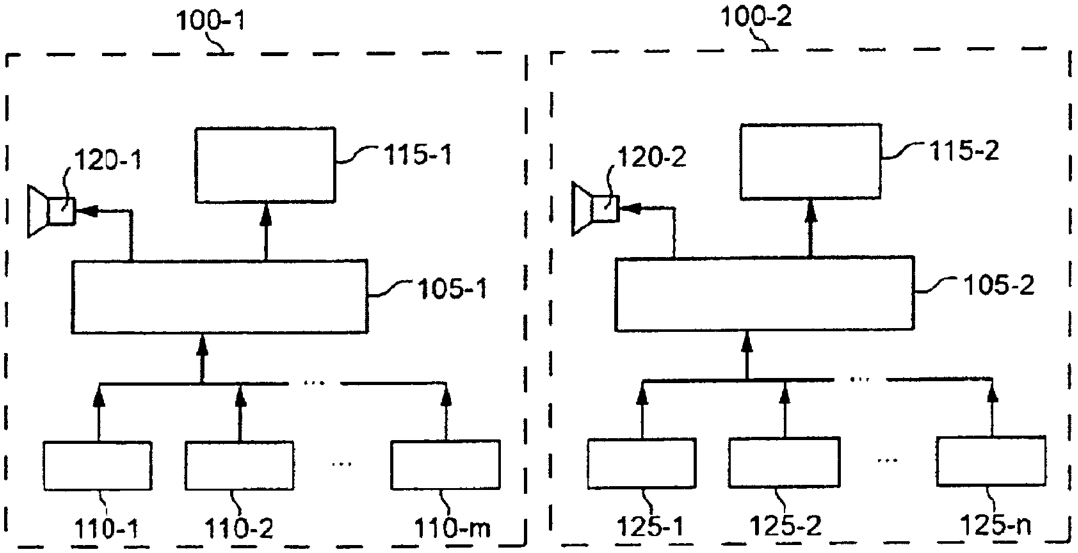
Fig. 1 (prior art)
FIG. 1 schematically illustrates a standard alarm device making it possible to manage warnings linked to the piloting and cargo operations.
Figure 2:
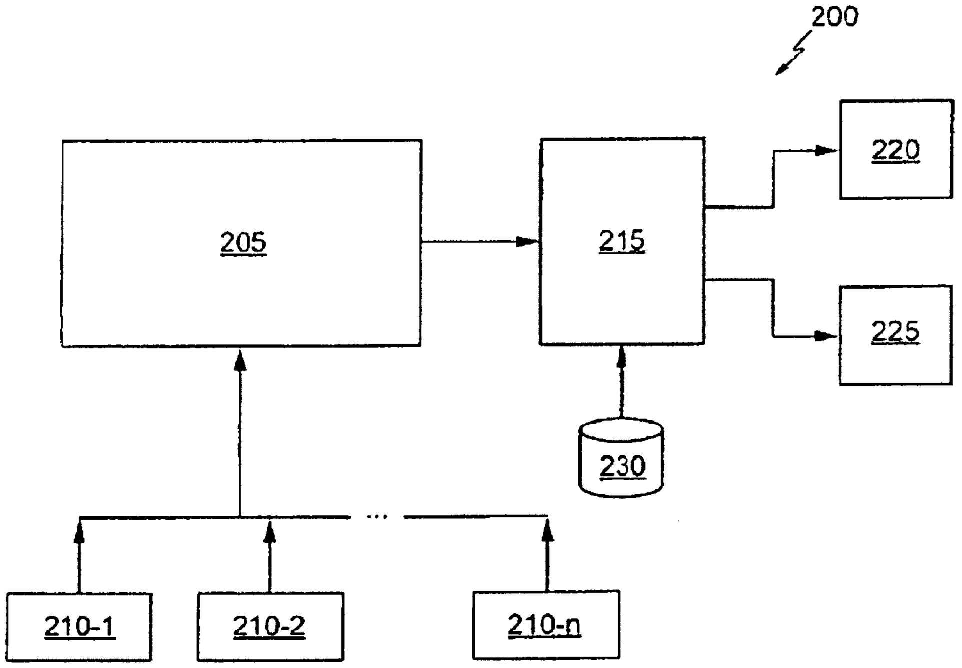
FIG. 2 illustrates a first embodiment of a device for centralized management of warnings in an aircraft allowing the synchronization of several warning presentation interfaces in accordance with the invention.

FIG. 2 illustrates this first embodiment.

Architecture 200 here comprises a centralized system for management of warnings 205, for example an FWS, to which there are connected systems 210-1 to **210-*n* from which the information items used for identifying the alarms are received. The calculated and, preferably, confirmed warnings are transmitted to a filtering module 215 to which there are connected interfaces 220 and 225 adapted for displaying the warnings and /or for indicating them acoustically. Interface 220 here represents the cockpit interface while interface 225** represents the cargo interface.

It should be noted here that filtering module 215 may be integrated into centralized system for management of warnings 205.

Filtering module 215 has as an object to filter the warnings received from centralized system for management of warnings 205, for example in the form of messages. These messages in particular may be filtered according to their identifier and a set of predetermined rules stored in a database 230.

In this way, the warnings intended only for the cockpit are transmitted to interface 220, the warnings intended only for the cargo are transmitted to interface 225 and the warnings intended for the cockpit and the cargo are transmitted to interfaces 220 and 225.

Although only two interfaces 220 and 225 are shown on FIG. 2, it should be understood that the filtering module may be connected to a greater number of interfaces.

Figure 3:
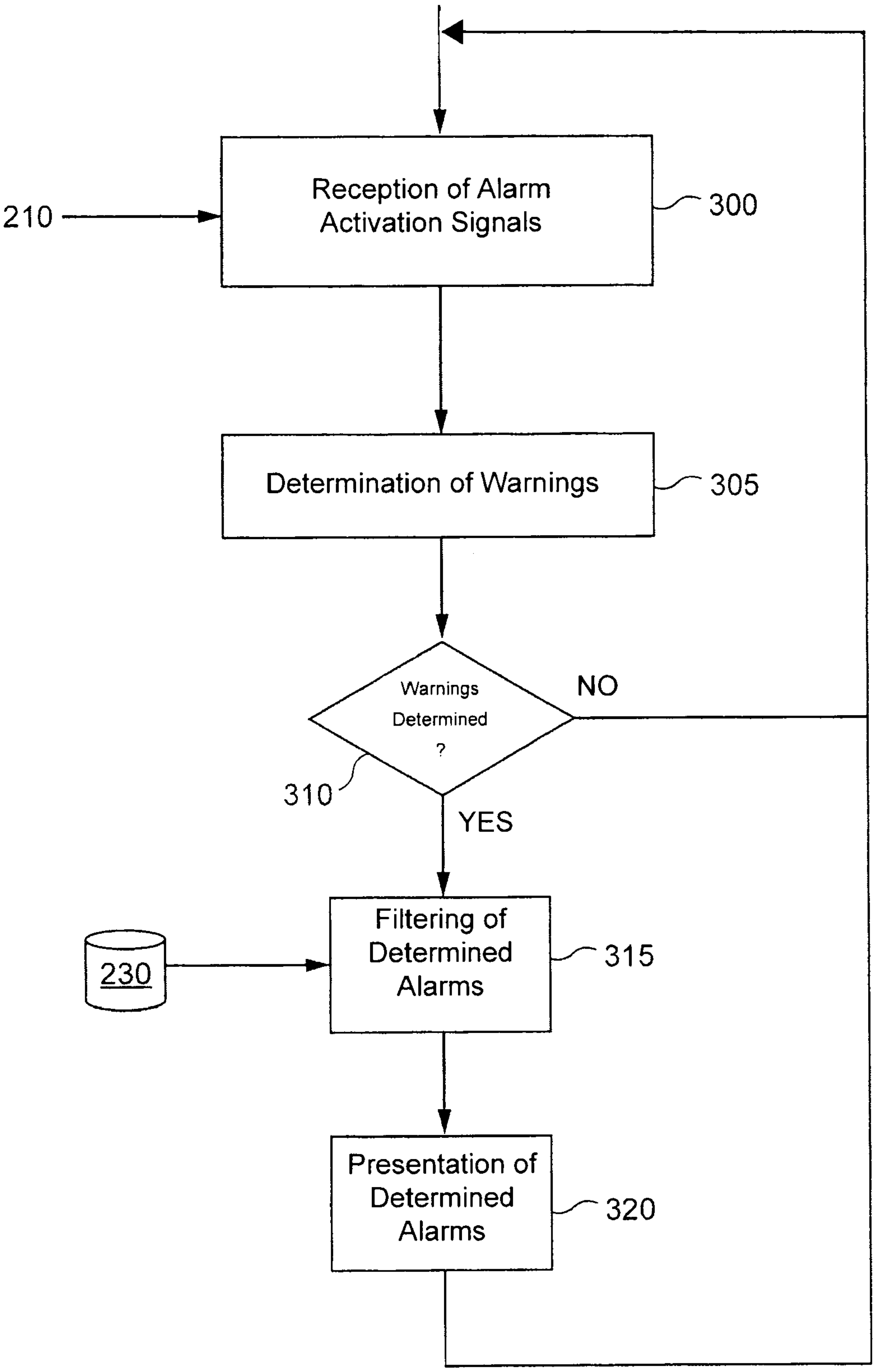
FIG. 3 schematically illustrates an exemplary algorithm for managing warnings in accordance with the architecture shown on FIG. 2.

FIG. 3 schematically illustrates an exemplary algorithm for managing warnings in accordance with the architecture shown on FIG. 2.

A first step (step 300) has as an object to receive alarm activation signals from systems 210-1 to **210-*n* , generically referenced 210**.

These signals are processed (step 305) by the centralized system for management of warnings to calculate and, if need be, determine warnings. If no warning is determined (step 310), the preceding steps (steps 300 and 305) are repeated to process the alarm activation signals received.

If at least one warning is determined (step 310), the determined warnings are filtered (step 315), for example according to predetermined rules stored in database 230, to identify from which interfaces they are to be presented to the crew members (step 320). As described above, this step makes it possible in particular to select the cockpit interface and/or the cargo interface according to the nature of the warnings.

The preceding steps (steps 300 to 320) then are repeated to process the alarm activation signals received.

Steps 300, 305 and 310 here are implemented in centralized system for management of warnings 205, step 315 is implemented in filtering module 215 (that may belong to centralized system for management of warnings 205) and step 320 is implemented in interfaces 220 and 225.

According to a second embodiment, the centralized system for management of warnings, for example the FWS, manages only the detection of alarms linked to the cockpit operations. The centralized system for management of warnings furthermore makes available to other systems, called peripheral warning systems, managing their own interfaces, the result of its warning calculations preferably taking into account, in particular, a filtering according to the flight phase, inter-alarm silencing, priority management and commands from the cockpit crew. The peripheral warning systems themselves ensure, among the messages received from the FWS, the selection of cockpit warning messages relevant for being presented on the interface associated with the peripheral warning system concerned.

The transmission of messages between the centralized system for management of warnings and the peripheral warning system advantageously uses a protocol implemented in the aircraft, for example the protocol used between the FWS and a maintenance system.

The information items transmitted by the centralized system for management of warnings to these peripheral warning systems may be transmitted with the aid of a protocol adapted for indicating, for example, the state of activation, display and deactivation of each alarm but also any additional information item that may be relevant such as the wording of the title or of the failure message, the type and level of the alarm. According to this embodiment, each peripheral warning system furthermore is responsible for the detection and display of their specific warnings, that is to say the alarms not relating to the cockpit operations (the alarms being relevant for the cockpit crew members being managed here by the centralized system for management of warnings).

Figure 4:
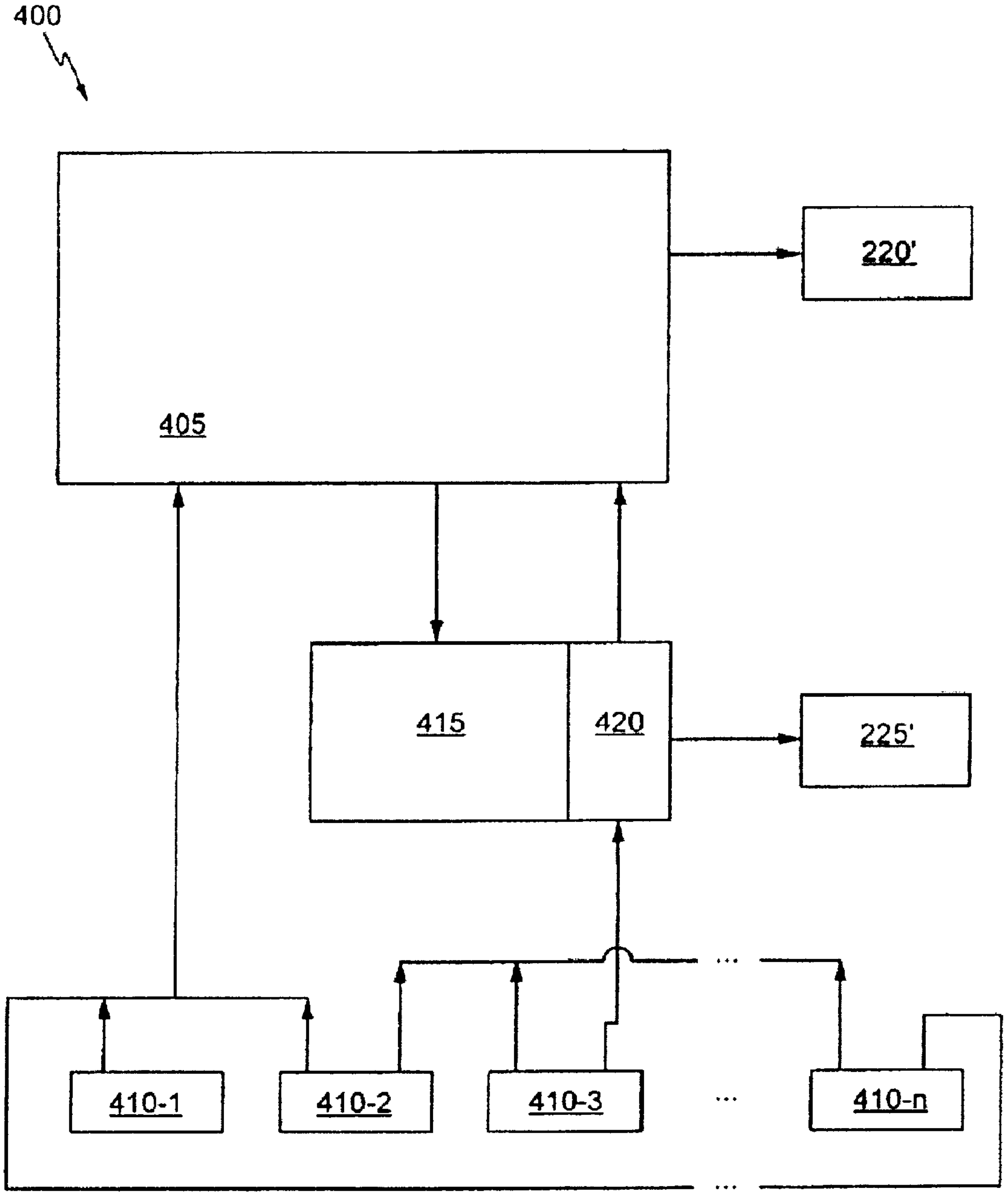
FIG. 4 illustrates a second embodiment of a device for centralized management of warnings in an aircraft allowing the synchronization of several warning presentation interfaces in accordance with the invention.

FIG. 4 illustrates this second embodiment.

Architecture 400 here comprises a centralized system for management of warnings 405, for example an FWS, to which there are connected some of systems 410-1 to **410-*n* from which information items used for identifying the alarms are received. According to FIG. 4, systems 410-1, 410-2 and 410-*n* are connected to centralized system for management of warnings 405**.

The warnings calculated and, preferably, confirmed by centralized system for management of warnings 405, are transmitted to interface 220' here similar to interface 220 described with reference to FIG. 2. These warnings thus are those linked to the cockpit operations.

Moreover, these warnings are transmitted to peripheral warning system 415 to which there is connected interface 225', here similar to interface 225 described with reference to FIG. 2.

Peripheral warning system 415 comprises a filtering module making it possible to filter the messages received from centralized system for management of warnings 405 so that only the received warnings pertinent for interface 225' are transmitted thereto. The filtering module uses, for example, predetermined rules stored in a database (not shown).

Peripheral warning system 415 also comprises a module for management of warnings to which there are connected some of systems 410-1 to **410-*n* from which information items used to identify the alarms are received. According to FIG. 4, systems 410-2, 410-3 and 410-*n* are connected to peripheral warning system 415. The warnings calculated and, preferably, confirmed by peripheral warning system 415, are transmitted to interface 225'**.

The peripheral warning system advantageously further comprises a gateway module 420 making it possible to transmit information items received from some of systems 410-1 to **410-*n* when these systems are connected to peripheral warning system 415 but not to centralized system for management of warnings 405. Thus, by way of illustration, centralized system for management of warnings 405 may use information items received from system 410-3 via peripheral warning system 415** to manage warnings linked to the cockpit operations.

In this way, alarm activation signals are transmitted directly from systems 410-1, 410-2 and **410-*n* to centralized system for management of warnings 405. Moreover, alarm activation signals are transmitted from system 410-3 to centralized system for management of warnings 405 via peripheral warning system 415**. These activation signals thus make it possible to detect failures linked to these systems and to cockpit operations.

Similarly, alarm activation signals are transmitted directly from systems 410-2, 410-3 and **410-*n* to peripheral warning system 415**. These activation signals thus make it possible to detect failures linked to these systems and to cargo operations, not affecting the cockpit operations.

In this way, centralized system for management of warnings 405 manages the detection of failures to make it possible to inform the cockpit crew members via specific interface 220', for example in the form of messages. Peripheral warning system 415 directly manages the detection of its alarms and the indication thereof with the aid of associated interface 225'. Peripheral warning system 415 further indicates, with the aid of associated interface 225' warnings in common with the cockpit, the characteristics of which are received from centralized system for management of warnings 405, being relevant for users of interface 225'.

It is seen here that although a single peripheral warning system 415 and an associated interface 225' are shown on FIG. 4, several peripheral warning systems and associated interfaces may be implemented in similar manner.

Figure 5:
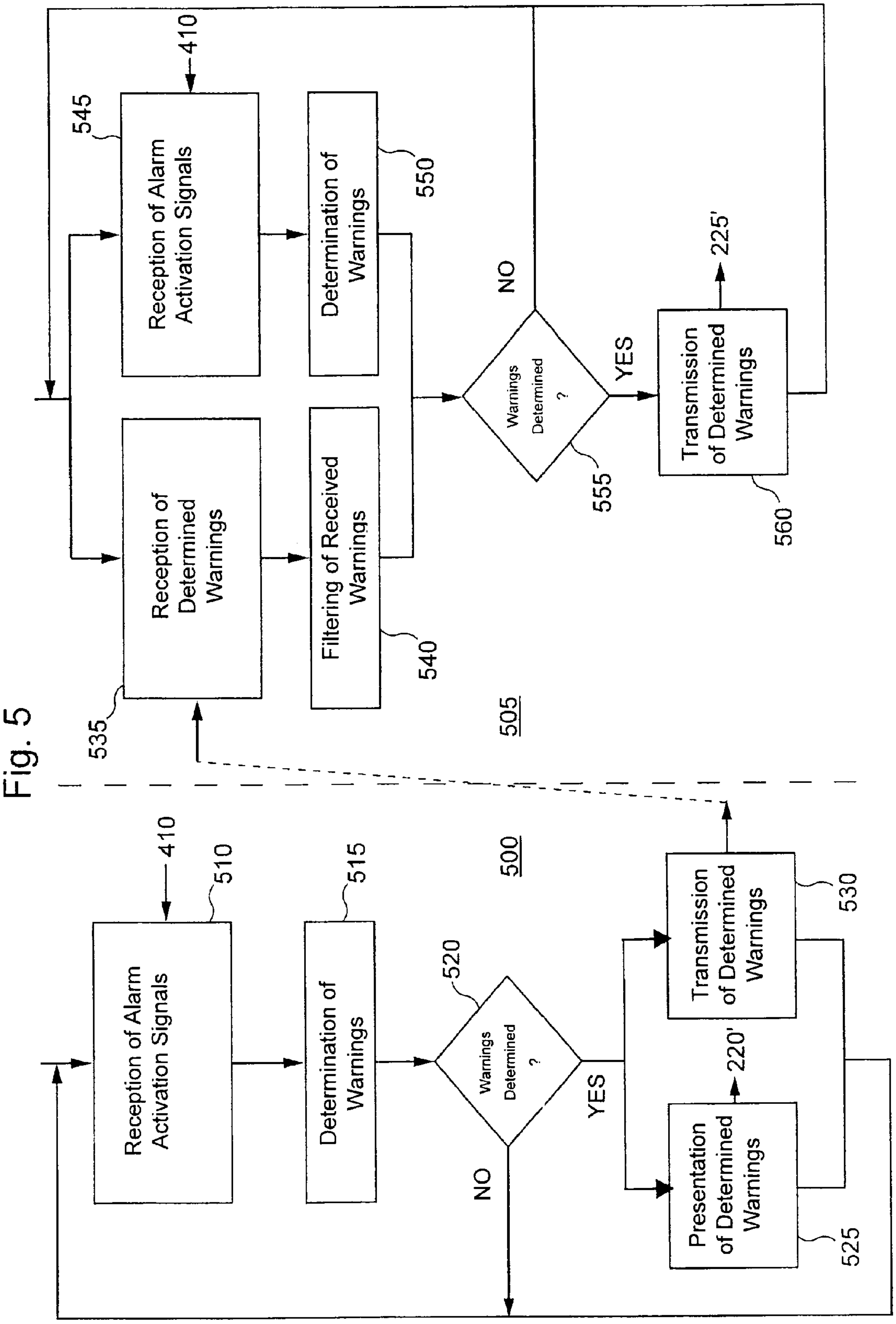
FIG. 5 schematically illustrates an exemplary algorithm for managing warnings in accordance with the architecture shown on FIG. 4.

FIG. 5 schematically illustrates an exemplary algorithm for managing warnings in accordance with the architecture presented on FIG. 4.

As shown, the algorithm here comprises several parts, part 500 being implemented in centralized system for management of warnings 405 as well as associated interface 220' and part 505 being implemented in each peripheral warning system as well as in the associated interface, that is to say in peripheral warning system 415 and interface 225'.

A first step (step 510) for part 500 has as an object to receive alarm activation signals from some of systems 410-1 to **410-*n* , generically referenced 410**.

These signals are processed (step 515) by centralized system for management of warnings 405 to calculate and, if need be, determine warnings. It no warning is determined (step 520), the preceding steps (steps 510 and 515) are repeated to process the alarm activation signals received.

If at least one warning is determined (step 520), the determined warnings are presented to the cockpit crew members with the aid of interface 220' (step 525).

Simultaneously, or sequentially, the determined warnings transmitted, in particular, to the peripheral warning systems, in particular to peripheral warning system 415 (step 530).

The preceding steps (steps 510 to 530) then are repeated to process the alarm activation signals received.

In parallel manner a step (step 535) for part 505 has as an object to receive warnings determined by the centralized system for management of warnings. The warnings received from the centralized system for management of warnings then are filtered (step 540) to select only the pertinent warnings having relevance for the peripheral warning system considered, here the peripheral warning system linked to the cargo operations.

Simultaneously, alarm activation signals are received (step 545) from some of systems 410-1 to **410-*n* , generically referenced 410**.

These signals are processed (step 550) by peripheral warning system 415 to calculate and, if need be, determine warnings. If no pertinent warning is received from the centralized system for management of warnings or determined by the peripheral warning system (step 555), the preceding steps (steps 535 to 550) are repeated to process the alarm activation signals received and, if need be, the warnings determined in the centralized system for management of warnings.

If at least one warning is determined (step 555), the determined warnings are presented to the cargo crew members with the aid of interface 225' (step 560).

The preceding steps (steps 535 to 560) then are repeated to process the alarm activation signals received and, if need be, the warnings determined in the centralized system for management of warnings.

According to a specific implementation, the medium and protocol for exchange of information items relating to alarms common between the centralized and peripheral warning systems are those used to transmit warnings from the centralized system for management of warnings to the maintenance system also called CMS (abbreviation for Centralized Maintenance System in English terminology). This medium and this protocol for exchange of information items are, for example, those implemented in the airplane A380 (A380 is a trade name) where the CMS uses information items relating to the activation of the alarms to automatically draw up the PFR (abbreviation for Post-Flight Report in English terminology) that lists all the failure occurrences observed on a flight.

According to this specific embodiment, these protocol messages are used as support for the synchronization of several interfaces located at different places in the aircraft.

By way of illustration, three types of messages which may be transmitted asynchronously by the centralized system for management of warnings to the peripheral warning systems, according to a waiting-line reception mode, are considered here. The first type of messages applies to calculated and confirmed warnings, the second the displayed warnings and the third the deactivated warnings. When a warning is calculated and confirmed, a message of the first type is transmitted. During display of this warning, a message of the second type is transmitted. Finally, when this warning is deactivated by a crew member, a third-type message is transmitted.

Each message may concern several warnings.

Messages of the first type comprise, for each warning calculated and confirmed, the identification code of the warning (also called FDCE, abbreviation for Flight Deck and Cargo Effects in English terminology), the type of warning, the level of the warning and the title of the warning or working of the message.

The make-up of these messages obeys the following rules:

- the first byte of the message gives the total size, in number of bytes, taken up by the information items of the first warning (sum of the size in bytes of the identification code, the size in bytes of the type, the size in bytes of the level and size in bytes of the title or the wording of the message);

- the following bytes successively provide the identification code, the type, the level then the title or wording of the message of the first warning;
- the size, the identification code, the type, the level, then the title or wording of the message of each of the following warnings are described successively in the message;
- the total size of the message is not to exceed 8,192 bytes, a second message being made up in the event that the maximal authorized size is exceeded; and,
- the information items concerning a warning may not be divided up in two different messages.

Messages of the second type comprise, for each warning calculated and confirmed, the identification code of the alarm and the level of the warning.

The make-up of these messages obeys the following rules:

- the first message comprises the level followed by the identification code of the first warning;
- the level then the identification code of each of the following warnings are described successively in the message;
- the total size of the message is not to exceed 8,192 bytes, a second message being made up in the event that the maximal authorized size is exceeded; and,
- the information items concerning a warning may not be divided up in two different messages.

Messages of the third type comprise, for each warning calculated and confirmed, the identification code of the alarm.

The make-up of these messages obeys the following rules:

- the first message comprises the identification code of the first warning;
- the identification codes of each of the following warnings are described successively in the message;
- the total size of the message is not to exceed 8,192 bytes, a second message being made up in the event that the maximal authorized size is exceeded; and,
- the information items concerning a warning may not be divided up in two different messages.

FIG. 6, comprising FIGS. 6*a*, 6*b* and 6*c*, illustrates an exemplary structure of messages in accordance with the first, second and third types, respectively.

In this way, when messages of first, second or third type are generated by the centralized system for management of warnings, they are transmitted to be used by the CMS as well as by the peripheral warning systems in accordance with the invention.

Figure 7:
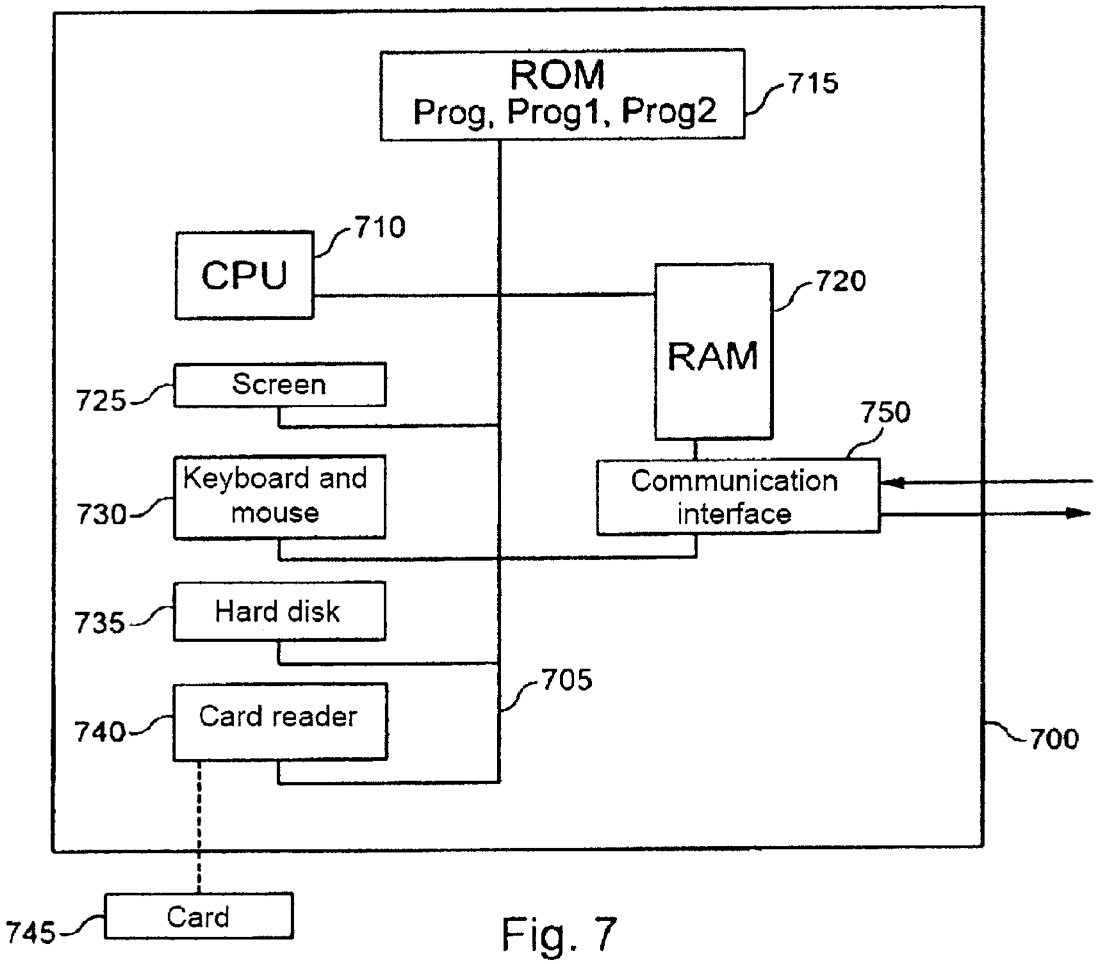

FIG. 7 illustrates an exemplary hardware architecture adapted for implementing the invention, in particular the centralized system for management of warnings and the peripheral warning systems described with reference to FIGS. 2 and 4. Device 700, of computer or data-processing machine type, here comprises a communication bus 705 to which there are connected:

- a central processing unit or microprocessor 710 (CPU, abbreviation for Central Processing Unit in English terminology);
- a read-only memory 715 (ROM, acronym for Read Only Memory in English terminology) that can comprise the programs necessary for implementation of the invention;
- a random-access memory or cache memory 720 (RAM, acronym for Random Access Memory in English terminology) comprising registers adapted for recording variables and parameters created and modified in the course of execution of the aforesaid programs; and
- a communication interface 750 adapted for transmitting and receiving data, in particular to and from the controlled devices of the aircraft in order to monitor them and know their state.

Device 700 preferably also has the following components:

- a screen 725, used as an interface with a member of the crew, making it possible to display data such as information items linked to the state of the aircraft and that is able to serve as a graphical interface with the user who will be able to interact with the programs, with the aid of a keyboard and a mouse 730 or another pointing device such as a touch screen or a remote control;
- a hard disk 735 that can comprise the aforesaid programs and data processed or to be processed according to the invention; and
- a memory card reader 740 adapted for receiving a memory card 745 and reading or writing therein data processed or to be processed according to the invention.

The communication bus permits communication and interoperability among the various components included in device 700 or connected thereto. The depiction of the bus is not limitative and, in particular, the central unit is able to communicate instructions to any component of device 700 directly or via another component of device 700.

The executable code of each program permitting the programmable device to implement the processes according to the invention can be stored, for example, on hard disk 735 or in read-only memory 715.

According to a variant, memory card 745 can contain data, in particular a table of correspondence between the events detected and the commands that can be requested, as well as the executable code of the aforesaid programs which, once read by device 700, is stored on hard disk 735.

According to another variant, the executable code of the programs will be able to be received, at least partially, via communication interface 750, to be stored in a manner identical to that described above.

More generally, the program or programs will be able to be loaded into one of the storage means of device 700 before being executed.

Central unit 710 is going to control and direct the execution of the instructions or portions of software code of the program or programs according to the invention, which instructions are stored on hard disk 735 or in read-only memory 715 or else in the other aforesaid storage components. During boot-up, the program or programs that are stored in a non-volatile memory, for example hard disk 735 or read-only memory 715, are transferred to random access memory 720 which then contains the executable code of the program or programs according to the invention, as well as the registers for storing the variables and parameters necessary for implementation of the invention.

Naturally, to satisfy specific needs, an individual competent in the field of the invention will be able to apply modifications in the foregoing description.

The invention claimed is:

1. A method for centralized management of warnings in an aircraft including a centralized system for management of warnings and a plurality of warning presentation interfaces, each of the interfaces being configured to present at least one warning to a user, the method comprising:

- determining at least one warning in the centralized system according to at least one alarm activation signal received;
- presenting the at least one warning by a first interface of the plurality of warning presentation interfaces, the first interface being an interface in one of a cockpit of the aircraft and a cargo area of the aircraft;
- filtering the at least one determined warning to determine whether to also present the at least one determined warning by a second interface of the plurality of warning presentation interfaces, the second interface being separate from the first interface and being an interface in the other one of the cockpit of the aircraft and the cargo area of the aircraft; and presenting, by the second interface, the at least one determined warning, in response to a determination by the filtering that the at least one determined warning is to also be presented by the second interface.

2. The method according to claim 1, wherein the presenting of the at least one determined warning by the first interface further includes filtering to determine whether to present the at least one determined warning by the first interface.

3. The method according to claim 1, further comprising transmitting the at least one determined warning to a peripheral warning system associated with the second interface, the filtering of the at least one determined warning being implemented in the peripheral warning system.

4. The method according to claim 3, further comprising determining at least one warning in the peripheral warning system.

5. A non-transitory computer-readable storage medium including computer executable instructions, wherein the instructions, when executed by a computer, cause the computer to perform a method for centralized management of warnings in an aircraft, the method comprising:

determining at least one warning in a centralized system for management of warnings according to at least one alarm activation signal received;

presenting the at least one warning by a first interface of a plurality of warning presentation interfaces, the first interface being an interface in one of a cockpit of the aircraft and a cargo area of the aircraft;

filtering the at least one determined warning to determine whether to also present the at least one determined warning by a second interface of the plurality of warning presentation interfaces, the second interface being separate from the first interface and being an interface in the other one of the cockpit of the aircraft and the cargo area of the aircraft; and presenting, by the second interface, the at least one determined warning, in response to a determination by the filtering that the at least one determined warning is to also be presented by the second interface.

6. A device for management of warnings in an aircraft, the device comprising:

centralized means for management of warnings to determine at least one warning according to at least one alarm activation signal;

first means for presentation of warnings to present the at least one warning determined by the centralized means;

second means for presentation of warnings that is separate from the first means for presentation of warnings; and means for filtering to filter the at least one warning to determine whether to also present the at least one warning by the second means for presentation of warnings, wherein the second means for presentation of warnings presents the at least one warning, in response to a determination by the means for filtering that the at least one warning is to also be presented by the second means, and the first means for presentation of warnings is in one of a cockpit of the aircraft and a cargo area of the aircraft, and the second means for presentation of warnings is in the other one of the cockpit of the aircraft and the cargo area of the aircraft.

7. The device according to claim 6, wherein the means for filtering belong to the centralized means for management of warnings, the first means for presentation of warnings presenting at least one warning determined by the centralized means for management of warnings and filtered by the means for filtering.

8. The device according to claim 6, further comprising peripheral warning means associated with the second means for presentation of warnings, the peripheral warning means including the means for filtering.

9. The device according to claim 8, wherein the peripheral warning means includes gateway means to transmit at least one alarm activation signal received by the peripheral warning means to the centralized means for management of warnings.

10. An aircraft comprising:

a centralized computing device configured to determine at least one warning according to at least one alarm activation signal;

a first interface configured to present the at least one warning;

a second interface that is separate from the first interface; and a filtering computing device configured to filter the at least one warning to determine whether to also present the at least one warning by the second interface, wherein the second interface is configured to present the at least one warning, in response to a determination by the filtering computing device that the at least one warning is to also be presented by the second interface, and the first interface is an interface in one of a cockpit of the aircraft and a cargo area of the aircraft, and the second interface is an interface in the other one of the cockpit of the aircraft and the cargo area of the aircraft.

11. The aircraft according to claim 10, wherein the first interface is in the cockpit of the aircraft, and the second interface is in the cargo area of the aircraft.

* * * * *

UNITED STATES PATENT AND TRADEMARK OFFICE

CERTIFICATE OF CORRECTION

PATENT NO. : 8,525,701 B2
APPLICATION NO. : 12/879561
DATED : September 3, 2013
INVENTOR(S) : Nicolas Fabas et al.

It is certified that error appears in the above-identified patent and that said Letters Patent is hereby corrected as shown below:

On the title page, Item (75), the 2nd Inventor's First Name is incorrect. Item (75) should read:

--(75) Inventors: Nicolas Fabas, Castelmaurou (FR);
Arnaud Bellier, Saint-Jean (FR)--

Signed and Sealed this
Twenty-ninth Day of October, 2013

Teresa Stanek Rea
*Deputy Director of the United States Patent and Trademark Office*